US000002039H

(19) United States

(12) Statutory Invention Registration

Holt et al.

(10) Reg. No.: US H2039 H

(43) Published: Aug. 6, 2002

(54) CLEARING OBSTACLES

(75) Inventors: William H. Holt, Fredericksburg, VA (US); Alexander G. Rozner, Potomac; Bernard P. Howder, Adelphi, both of MD (US)

(73) Assignee: The United States of America as represented by the Secretary of the Navy, Washington, DC (US)

(21) Appl. No.: 08/896,922

(22) Filed: Jul. 18, 1997

(51) Int. Cl.[7] ..... F42B 1/02

(52) U.S. Cl. ..... 102/307; 102/309; 102/357; 102/504; 102/505; 102/524

(58) Field of Search ..... 102/307, 309, 102/357, 504, 505, 524

*Primary Examiner*—Peter A. Nelson

(74) *Attorney, Agent, or Firm*—William Cecil Townsend; Edward J. Connors, Jr.

(57) ABSTRACT

System for clearing both light and heavy obstacles, in which one or more flying metal plates are propelled against heavy obstacles by explosive forces which also expand a folded continous rod member into a curvilinear, generally annular configuration that cuts through light obstacles such as concertina wire in the process of unfolding.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CLEARING OBSTACLES

BACKGROUND OF THE INVENTION

This invention relates to obstacle clearing or demolition using explosives.

Heavy obstacles such as concrete tetrahedrons are conventionally destroyed or cleared by placing haversack charges in close proximity to the obstacle and detonating the charges. Light obstacles such as coils of barbed wire or concertina which may be intermingled with the heavy obstacles are cleared by placing bangalore torpedoes (metal tubes filled with explosive) under the wire and detonating so that the blast and fragments cut the wire. Clearing both heavy and light obstacles in the conventional way thus requires men to go into close physical proximity to the respective obstacles to place the explosive charges. This may be dangerous because of the presence of antipersonnel mines or for other reasons.

It is an object of the invention to provide an improved system for clearing obstacles that overcomes the disadvantages of the prior art. Additional objects and advantages of the invention will appear from the following detailed description which, together with the accompanying drawings, discloses a preferred embodiment of the invention for purposes of illustration only. For definition of the invention, reference will be made to the appended claims.

Figure 1:
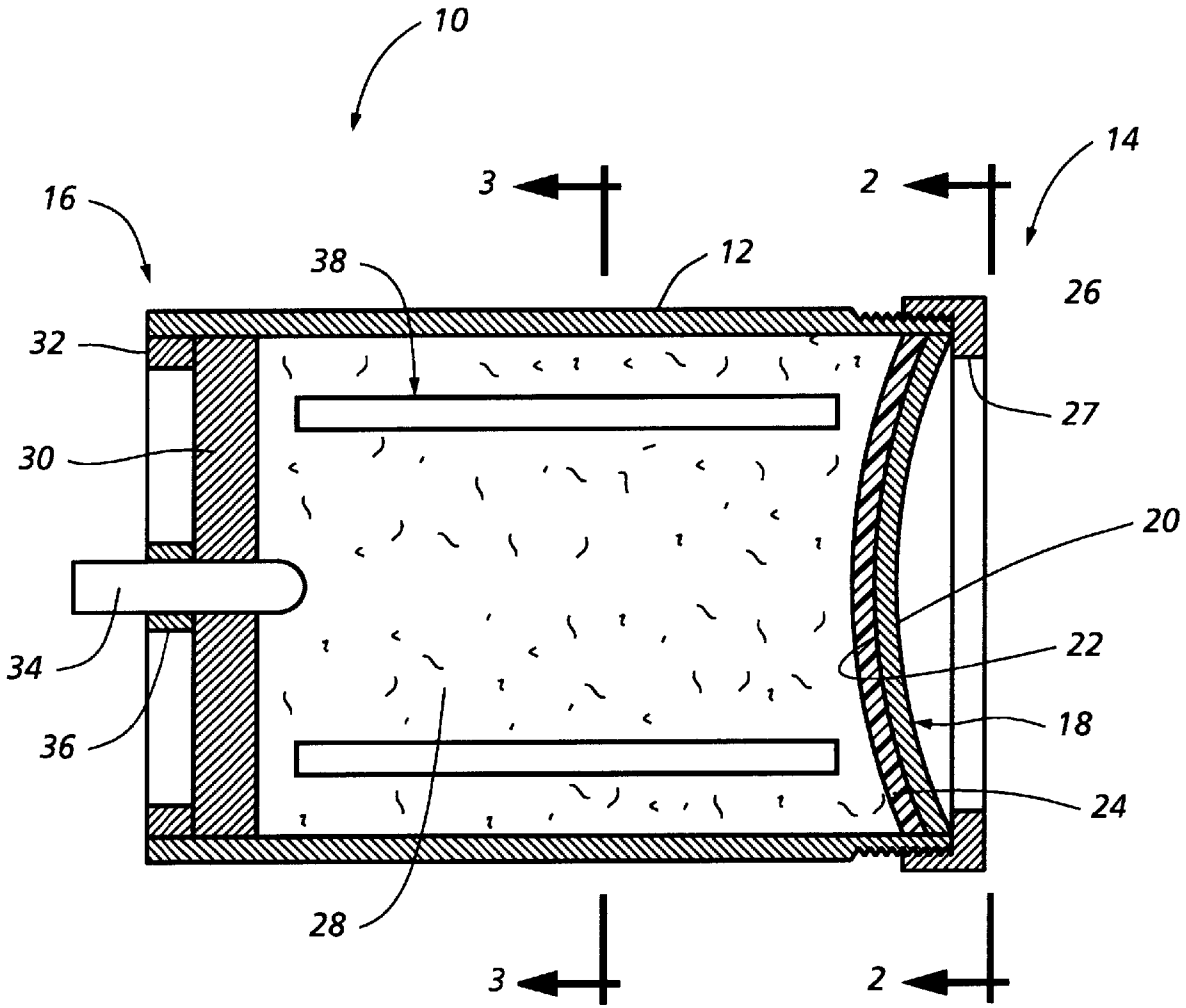
FIG. 1 is a longitudinal cross-sectional view of obstacle clearing apparatus embodying principles of the invention.

Primed reference characters denote elements similar to those with the corresponding unprimed characters.

DETAILED DESCRIPTION OF THE PREFERRED EMBODIMENT

Figure 2:
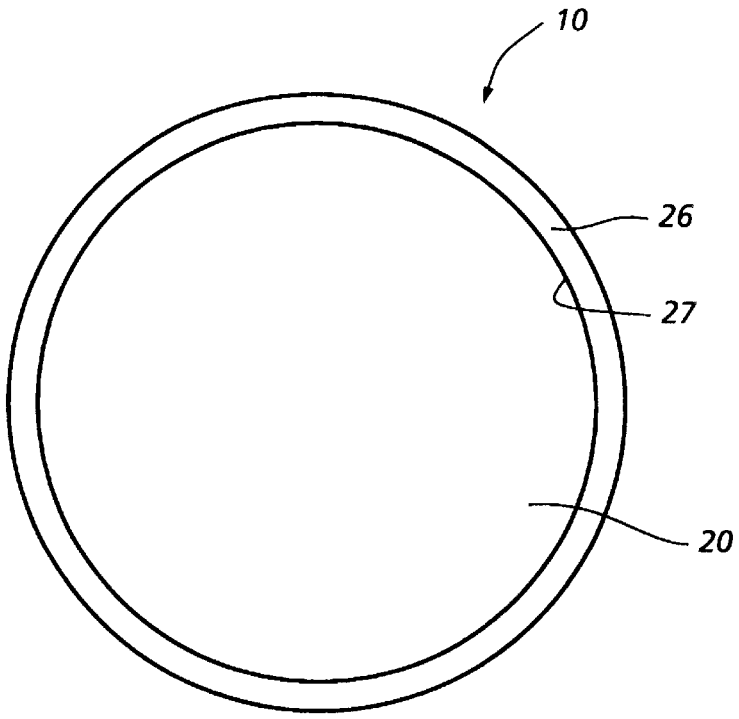
FIG. 2 is an elevational view on line 2—2 of FIG. 1.

The obstacle clearing apparatus of FIGS. 1 and 2 is generally indicated at 10 and comprises a hollow cylindrical body member 12 that may take the form of a section of commercial PVC (polyvinyl chloride) pipe. Body 12 has a fore side portion 14, an aft side portion 16, and additional side portions circumferentially around the cylinder of the pipe.

Apparatus 10 further comprises a flying metal plate member 18 mounted at the fore side portion of body 12. Flying metal plates and their power to breach holes in barriers of concrete and steel are known, see U.S. Pat. No. 5,524,546. Such plates have a concave front face 20, a convex rear face 22, and a generally uniform thickness. A layer of strong elastomeric material 24 covers rear face 22 of plate 18. Plate 18 is preferably made of copper.

Plate 18 is mounted on the fore side portion of body 12. An annular breakaway cap 26 threadedly engaged with threads formed on the outside of fore side body portion 14 has a radially inwardly projecting lip 27 that overlaps the outer periphery of plate 18 to hold the plate in position. The cavity formed by the hollow interior of body 12 is packed with an explosive 28 for propelling plate 18 towards an obstacle to be cleared. Rear side portion 16 of body 12 is closed by disk 30 that is held in place by an annular snap ring 32. Disk 30 has a central aperture for receiving a detonator 34 for detonating explosive 28. Hollow cylindrical fitting 36 is attached to closure disk 30 to aid in holding detonator 34 in position.

Figure 3:
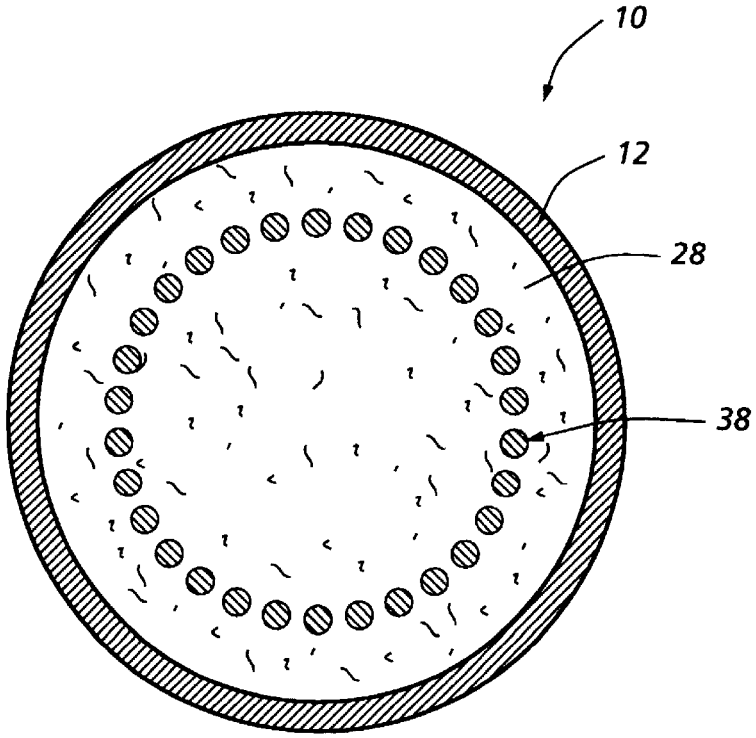
FIG. 3 is a cross-sectional view on line 3—3 of FIG. 1.
Figure 4:
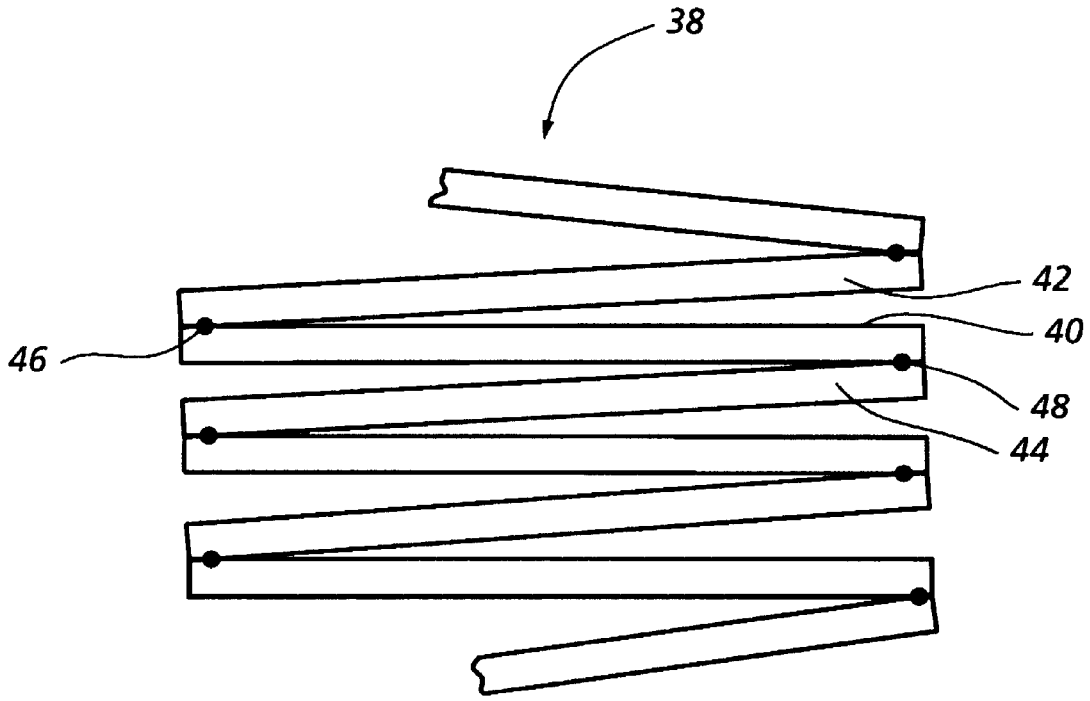
FIG. 4 is a schematic view of details of the folded continuous rod member of the apparatus of FIG. 1.

Embedded in explosive 28 is a continous rod member 38 that is folded into a multiplicity of accordion-like pleats (see also FIGS. 3, 4). In practice, continuous rod 38 may be formed from a multiplicity of relatively short rod or picket members, as 40, 42, 44 that are arrayed in generally side-by-side disposition circumferentially around the core of the mass of explosive 28 and joined together in the manner now to be described. Each picket has opposite end portions, and is joined at one end portion to the picket on one side, as picket 40 is joined to picket 42 at 46 in FIG. 4. Each picket is also joined at the other end portion to the picket on the opposite side, as picket 40 is joined to picket 44 at 48. With side-by-side pickets joined in this way the folded continous rod member expands towards a generally annular or hoop-like configuration under radially outwardly applied forces generated by detonation of the explosive mass in which it is embedded. In FIG. 4 the pickets are shown partially expanded, to facilitate explanation.

Figure 6:
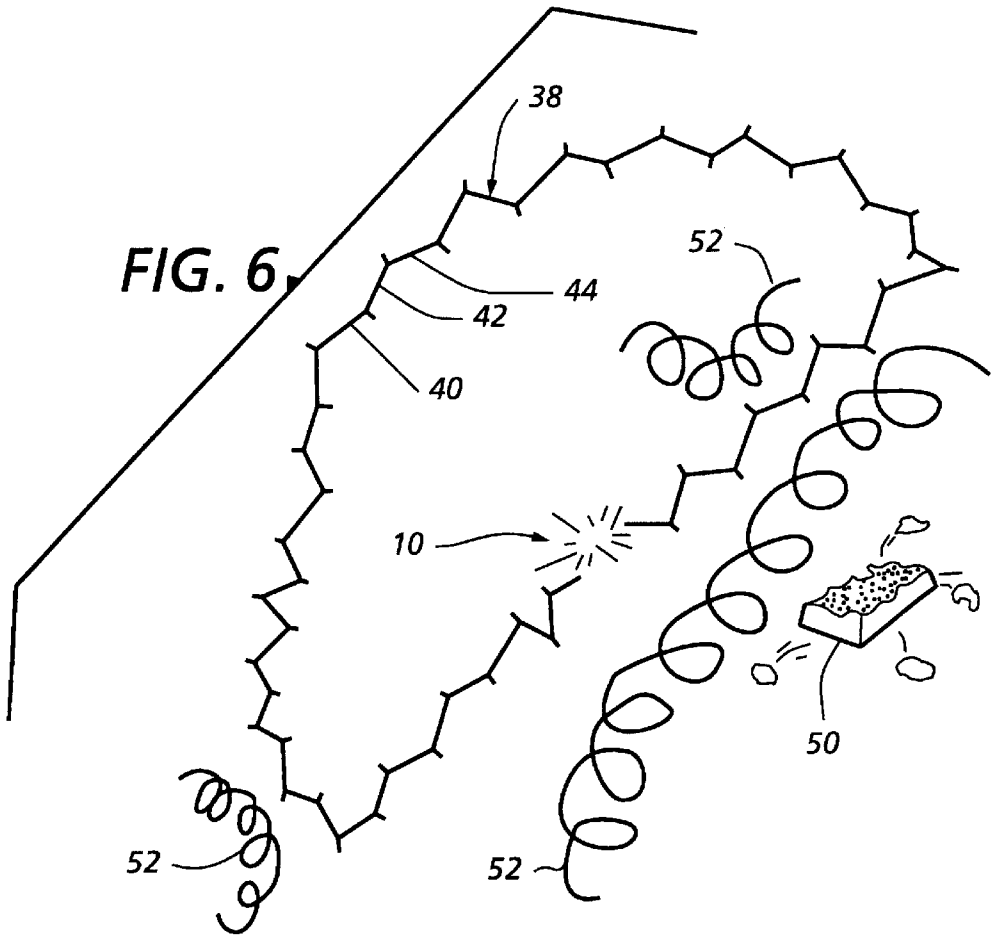
FIGS. 5 and 6 are sequential views schematically illustrating operation of the apparatus of FIG. 1.
Figure 5:
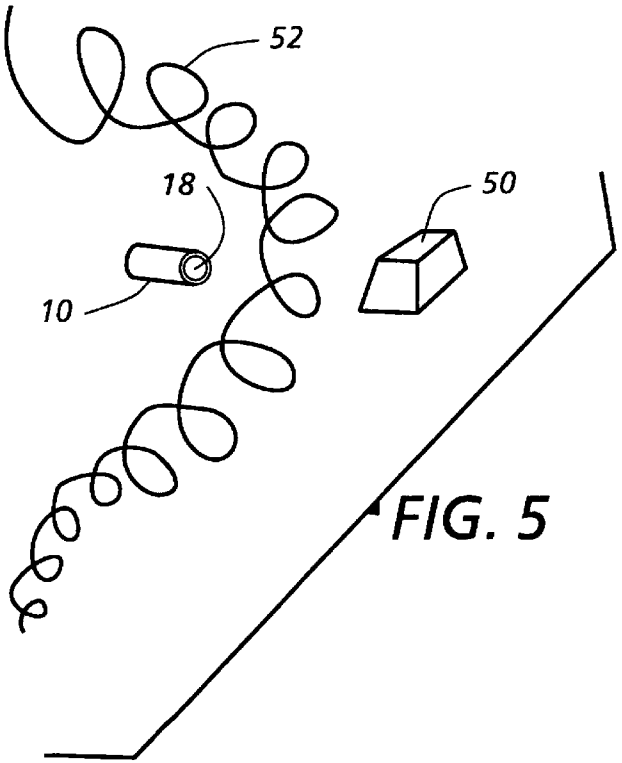

In operation (FIGS. 5, 6) obstacle clearing device 10 is positioned at a standoff distance (e.g. 10') from the obstacles to be cleared which in this example include a concrete tetrahedron 50 protected by a coil of concertina wire 52. Device 10 is arranged with flying plate 18 pointed at tetrahedron 50, and detonated. The flying plate shatters the tetrahedron, and under the forces generated by the explosion continous rod member 38 unfolds towards a generally curvilinear, hooplike configuration and in the process of so doing the rod member or fragments thereof cut concertina 52.

Figure 7:
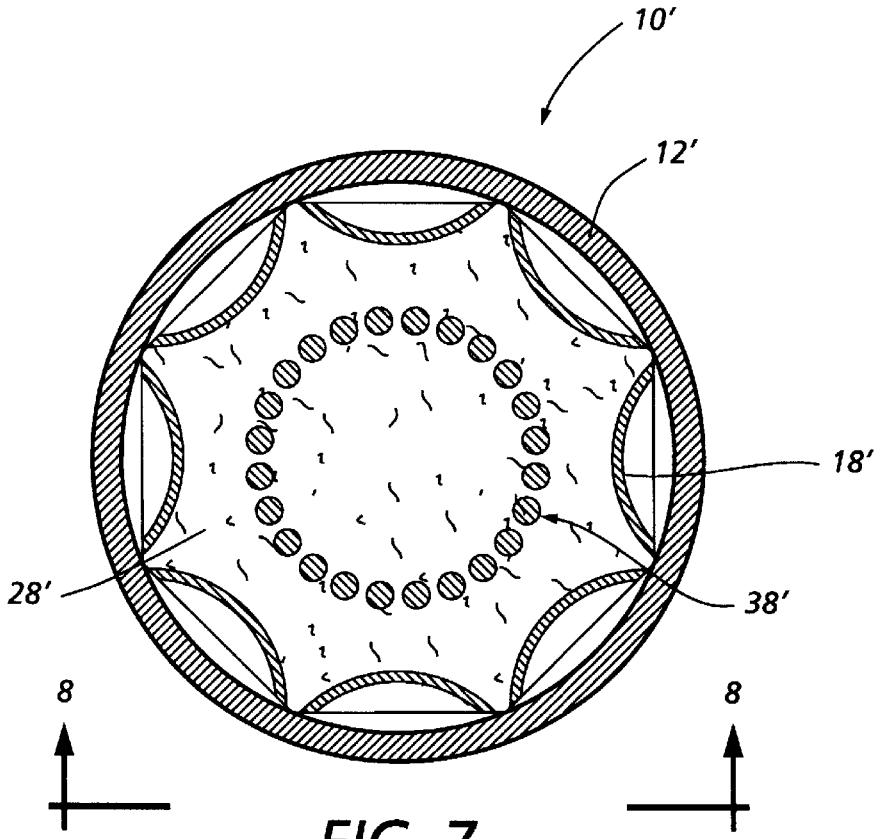
FIG. 7 is a cross-sectional view of a modified form of obstacle clearing apparatus embodying principles of the invention.
Figure 8:
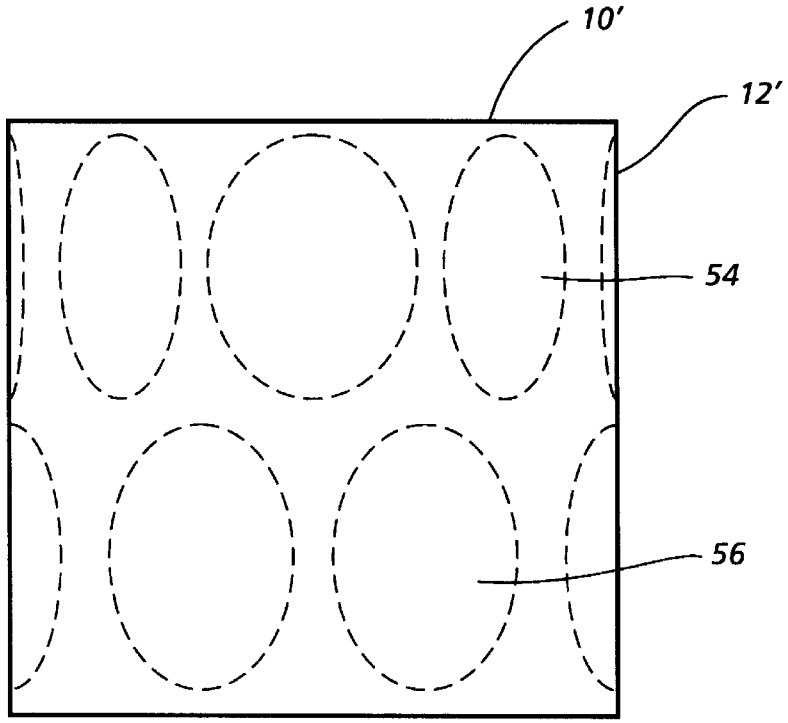
FIG. 8 is an elevational view on line 8—8 of FIG. 7.

In the modification of FIGS. 7–8, a plurality of plate members 18' are arrayed around the circumferential side portions of body 12', held in place against the inside wall of body 12' by the mass of explosive 28' in which continuous rod member 38' is embedded. In this modification, there are two layers 54, 56 of plates for engaging a plurality of obstacles spaced around obstacle clearing device 10'.

As has been said, copper is the preferred material for plate 18. Purity is not critical, and commercial grade copper is well suited to the application. Other relatively dense, ductile metals such as tantalum and lead are operable, but suffer from disadvantages such as high cost or contamination potential that are not present with copper. As used herein, the term "consisting essentially of copper" means pure copper and copper-base alloys containing at least about 90 w/o copper. The thickness of plate 18 is preferably from about 0.125" to about 0.250". Layer 24 of elastomeric material functions to prevent shattering of plate 18 in the explosion, and a plurality of materials including buna-N and silicone rubbers are suitable for the purpose. The thickness of the elastomeric layer may for example be about 0.060" for a 12" diameter plate 0.250" thick.

Continous rod member 38 is preferably made of steel from about 0.25" to 0.50" in diameter, with welds forming the joints between adjacent pickets. If desired, the folded rod array may be made by first making pairs of short rods or pickets with the pickets of each pair joined together at one end and arranging the pairs side by side with the joined ends together and with one picket of each pair on top of the other in the pair. Then the top picket is crossed over to the adjacent pair and welded to the bottom picket of that pair at the end opposite that at which the top picket is joined to the other picket in its own pair. Each picket may for example be about 12" in length and it should be noted that when using the device of the present invention against light obstacles only, standoff distances may be much greater (e.g. 50–100') depending upon the length and number of pickets in the array.

The explosive may be of any suitable, conventional high-energy type such as C-4 [about 91 w/o RDX (cyclotrimethylene trinitramine), 2.1 w/o rubber, 1.6 w/o oil and 5.3 w/o plasticizer. The detonator may be a blasting cap of any suitable type of conventional design, electrically operated or otherwise.

The radius of curvature of the concave face of plate 18 should approximate the diameter of the plate. For example, a 3" diameter plate may have a radius of curvature of about 3.5". Such a plate may be of about 0.125" thickness and weigh about 0.140 kg. The radius of curvature of the aforementioned 12" plate may be from about 12" to 16". Plates may range in diameter from about 1.5" (weighing 60 g) to 22" (weighing 33 lb.) and larger. The charge-to-mass ratio, that is to say the ratio of the mass of explosive charge to that of the plate, should be from about 1:1 to about 4:1. The 1:1 level is satisfactory only for relatively soft (e.g. wood) obstacles. But using 66 pounds of explosive to propel the aforementioned 22", 33 lb. plate against a heavy concrete obstacle would produce satisfactory results. The charge-to-mass ratio in such an arrangement is 2:1.

It has been found that, when the explosion takes place, the shock wave front contacts the back side of the apex of the concave plate and causes it to bulge forwardly so that the concave face becomes convex as the plate is propelled toward the target by the explosive forces. The bulging continues as the plate flies along its trajectory until the plate assumes the shape of a round-nosed, hollow tube that is open at the aft end. Upon impact, the round nose is flattened and the annular tube walls impact the target. In order for there to be sufficent time for the flying plate to assume its round-nosed, hollow tube configuration, the obstacle clearing device should be placed at a standoff distance from the obstacle that is at least 1.5 times the diameter of the plate. The diameter of plate required to clear an obstacle will vary with the size of the obstacle and the larger the obstacle the larger the plate is required. Ideally, the plate diameter should approximate the size of the obstacle but plates of given diameter will destroy obstacles larger than themselves.

Clearing obstacles in accordance with the invention is highly advantageous. The clearing device may be positioned at a standoff distance from the obstacles, eliminating requirements for men to go into close proximity to place explosive charges. Moreover, one device can be employed against both light and heavy obstacles simultaneously or individually.

What is claimed is:

1. Apparatus for clearing obstacles, comprising a body member having a side portion and an internal cavity, a metal plate member having a uniform thickness, a concave front face, and a convex rear face, a layer of elastomeric material on the convex rear face, means mounting the plate member on the side portion of the body member, explosive means in the cavity for propelling the plate member towards an obstacle, folded continuous rod means contained within the body member contiguously to the explosive means for unfolding under forces generated by the explosive means to cut through obstacles, and means for detonating the explosive means.

2. Apparatus as defined in claim 1, in which the metal plate member consists essentially of copper.

3. Apparatus as defined in claim 1, in which the body member has a plurality of side portions and a plate member mounted on each side portion.

4. Apparatus as defined in claim 1, in which the folded continuous rod means is embedded in the explosive means.

5. Apparatus as defined in claim 1, in which the folded continous rod means comprises a plurality of side-by-side picket members having opposite end portions, and means joining adjacent picket members to one another at their end portions for the folded rod means to expand towards a generally annular, curvilinear configuration under the forces generated by the explosive means.

6. Apparatus as defined in claim 1, in which the folded continuous rod means is arrayed in a circumferential direction around at least a portion of the explosive means.

* * * * *